US005988762A

United States Patent [19]

Asada et al.

[11] Patent Number: 5,988,762

[45] Date of Patent: Nov. 23, 1999

[54] RESIN WHEEL COVERS

[75] Inventors: Soichiro Asada; Shinichi Sugiyama, both of Ogaki; Toshiyuki Matsunami, Gifu; Hiroyuki Suzuki, Gifu-ken; Satoru Kawai, Ogaki, all of Japan

[73] Assignee: Pacific Industrial Co., Ltd., Gifu-Ken, Japan

[21] Appl. No.: 08/988,253

[22] Filed: Dec. 10, 1997

[30] Foreign Application Priority Data

Dec. 18, 1996 [JP] Japan .................................... 8-354885

[51] Int. Cl.[6] ........................................................ B60B 7/00

[52] U.S. Cl. .................. 301/37.1; 301/37.34; 301/37.31; 301/37.42; 264/266

[58] Field of Search ................................ 301/37.1, 37.34, 301/37.31, 37.32, 37.33, 37.39, 37.42, 108.3, 37.37; 264/266

[56] References Cited

U.S. PATENT DOCUMENTS

| | | | |
|---|---|---|---|
| 3,876,257 | 4/1975 | Buerger | 301/37.42 |
| 4,382,635 | 5/1983 | Brown et al. | 301/37.37 |
| 4,458,952 | 7/1984 | Foster et al. | 301/37.35 |
| 4,707,035 | 11/1987 | Kondo et al. | 301/37.37 |
| 4,740,038 | 4/1988 | Okano et al. | 301/37.36 |
| 4,995,674 | 2/1991 | Shirai et al. | 301/37.36 |
| 5,108,157 | 4/1992 | Chen | 301/37.42 |
| 5,128,085 | 7/1992 | Post et al. | 264/266 |
| 5,131,726 | 7/1992 | Collins | 301/37.36 |
| 5,161,860 | 11/1992 | Sakane | 301/37.42 |
| 5,393,128 | 2/1995 | Sarmast et al. | 301/37.34 |

FOREIGN PATENT DOCUMENTS

| | | |
|---|---|---|
| 63-114638 | 5/1988 | Japan . |
| 4-63701 | 2/1992 | Japan . |
| 4-110118 | 4/1992 | Japan . |

OTHER PUBLICATIONS

Frados, Joel. Plastics Engineering Handbook of the Society of the Plastics Industry, Inc. 4th Ed. New York: Van Nostrand Reinhold Company, Jan. 1976.

*Primary Examiner*—D. Glenn Dayoan
*Assistant Examiner*—Long Bao Nguyen
*Attorney, Agent, or Firm*—D. Peter Hochberg

[57] ABSTRACT

A wheel cover having resin main body obtained by injecting a molten resin into a closed mold consisting of at least two dies, curing the resin, and then separating the dies. Openings are formed through the wheel cover, and inclined decorative faces are formed around each opening. A transfer layer is transferred onto the front face of the main body simultaneously when the resin main body is molded by means of in-mold transferring. The boundary between the decorative faces of the wheel cover and the openings is the parting line where the dies are separated from each other. The inner diameters of the openings are tapered to facilitate die separation and removal.

12 Claims, 10 Drawing Sheets

11
25
26
31
32
34
35

RESIN WHEEL COVERS

BACKGROUND OF THE INVENTION

The present invention relates generally to an in-mold transfer method for simultaneously achieving injection molding and transference of a transfer foil from a transfer film placed in dies onto the surface of an injection-molded product, and more particularly, to a resin wheel cover molded using the method.

An in-mold transfer method for simultaneously achieving injection molding and transference of a transfer layer from a transfer film placed in dies onto the surface of an injection-molded product is known. This in-mold transfer method is carried out in accordance with the following steps.

As shown in FIG. 10A, a transfer film 54 for in-mold transferring is placed in a mold consisting of a first die 51 and a second die 52. The transfer film 54 is composed of a base film 55 and a transfer layer 56. Next, as shown in FIG. 10B, a molten resin is injected from an injection molding machine 57 into the dies 51 and 52. The resin fills the dies 51 and 52 conforming to the configuration of the cavity and core and also presses the transfer film 54. Thus, the transfer layer 56 is separated from the base film 55 and transferred onto the resin 59. The first and second dies 51 and 52 are separated from each other after the resin is cured, as shown in FIG. 10C, to obtain a resin product having the transfer layer 56 transferred thereon.

Meanwhile, wheel covers are resin products that can be produced by this known injection molding method. There are various shapes of wheel covers, and the in-mold transfer method can be used for producing those having substantially flat surfaces. However, some wheel covers have heat dissipation holes for dissipating heat generated by braking. A cross-sectional view of such a wheel cover 61 is shown in FIG. 11. This wheel cover 61 has communicating holes 64, each communicating a front face 62 and a rear face 63, and a decorative face 66 formed on the front face 62 around each communicating hole 64. The communicating hole 64 has a collar 65 extending from the rear face 63. The collar 65 is tapered such that the diameter of the collar 65 is smaller toward its distal end. The collars 65 are formed mainly for giving the impression that the wheel cover 61 is thick, i.e., the wheel cover 61 appears thicker than it actually is, when the collars 65 of the wheel cover 61 are viewed through the communicating holes 64.

The wheel cover 61 is molded by injecting a resin into a first die 68 and a second die 69, as shown in FIG. 12, and, after the resin is cured, the dies 68 and 69 are separated from each other to take the cured resin product out of the dies 68 and 69.

However, it is sometimes difficult to apply the in-mold transfer method to wheel covers like the wheel cover having decorative faces 66 formed around the communicating holes 64. More specifically, the transfer layer 56 is extended on the decorative faces 66 and on the inner wall surface of the communicating hole 64, as shown in FIG. 13. The transfer layer 56 may be broken if the inclination of the decorative faces 66 is steep and the transfer layer 56 is pulled much beyond its critical point of extension, or if it is wrinkled. If the transfer layer 56 is extended too much, even if it is not broken or wrinkled, the transfer layer 56, which is based on an aluminum vapor deposition layer, undergoes whitening and loses its primary metallic luster.

For solving this problem, the parting line (PL face) 70 of the first die 68 and the second die 69 may be shifted toward the front face 62, as shown in FIG. 14. In this case, the transfer layer 56 is merely extended to the Parting line 70, so that the problems attributed to excessive extension are avoided. However, according to this proposal, the tapered collars 65 hinder separation of the first die 68 from the second die 69. if the collars 65 are omitted, the wheel cover 61 does not appear to have greater thickness, and the rigidity around the communicating holes is lowered.

SUMMARY OF THE INVENTION

Broadly speaking, the present invention relates to resin wheel covers and a method of making resin wheel covers.

The present invention was accomplished with a view to solving he problems described above, and it is an objective of the invention to eliminate problems arising when a transfer layer is formed on a wheel cover having through holes when employing an in-mold transfer method.

In order to achieve the intended objective, the present invention provides a wheel cover formed by injecting a molten resin into a closed mold, which has at least two dies, curing the resin, and then separating the dies. The wheel cover has a main wall, which has a front surface and a rear surface. The front surface includes a front face and a sloped face. A transfer layer is transferred onto the front surface of the main wall simultaneously when the wheel cover is molded. An opening communicates between the front surface and the rear surface of the main wall. The size of the opening is at least as great at its rearmost extremity as it is at its frontmost extremity. The sloped face is formed on the front surface between the opening and the front face such that the sloped face is sloped with respect to the front face of the main wall toward the opening. A boundary line between the sloped face and the frontmost extremity of the opening defines a parting line where the dies are separated from each other.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments together with the accompanying drawings in which:

FIG. 6A shows a state where a transfer film is set in dies;

FIG. 6B shows a state where a resin is injected into the dies; and

FIG. 6C shows a state where a wheel cover is released from the dies;

FIG. 10A shows a state where a transfer film is set in dies;

FIG. 10B shows a state where a resin is injected into the dies; and

FIG. 10C shows a state where a wheel cover is released from the dies;

DETAILED DESCRIPTION OF THE PREFERRED EMBODIMENTS

The wheel cover according to one embodiment of the present invention will be described referring to FIGS. 1 to 9.

Figure 1:
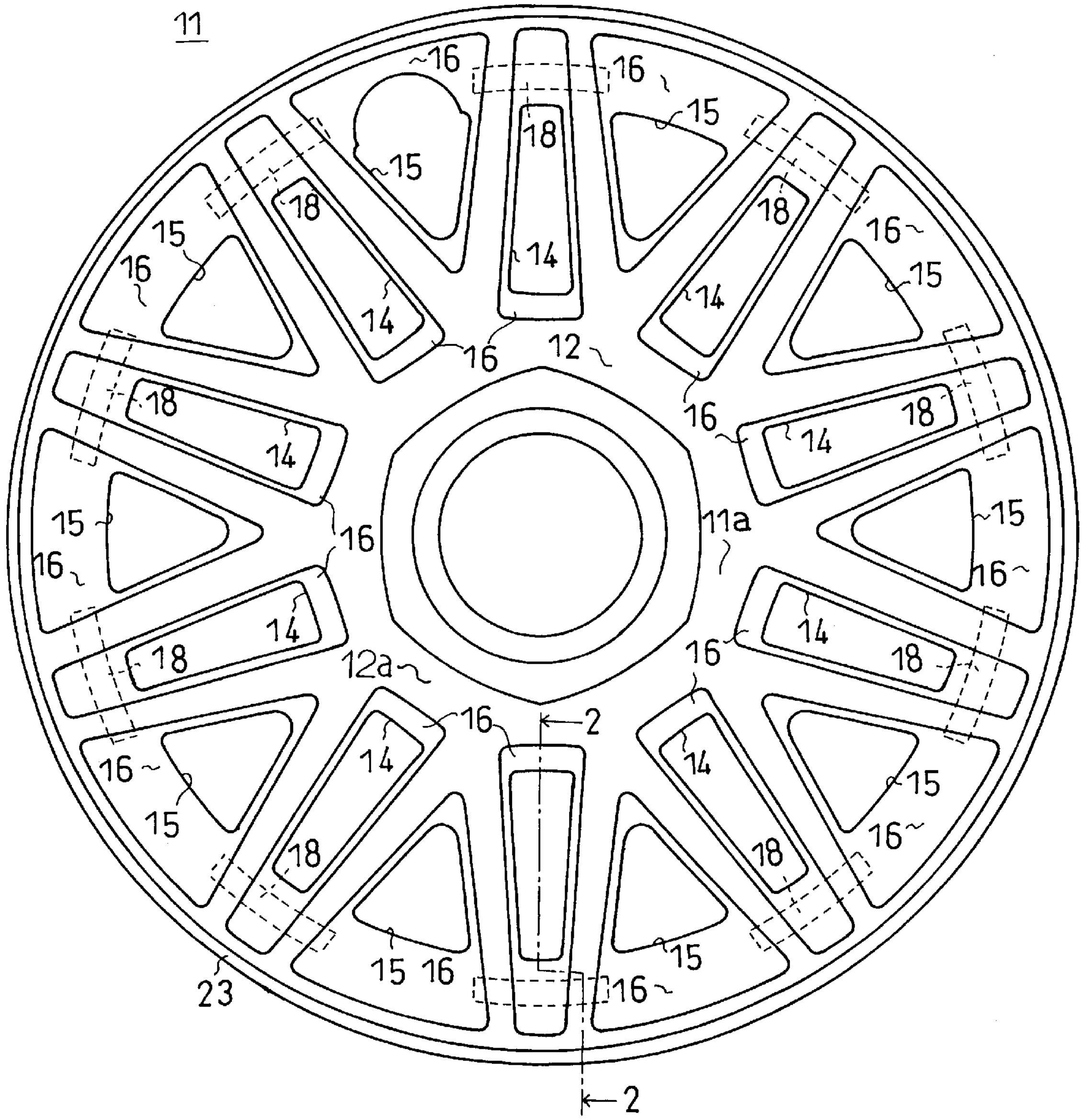
FIG. 1 is a front view of the wheel cover according to an embodiment of the invention.
Figure 2:
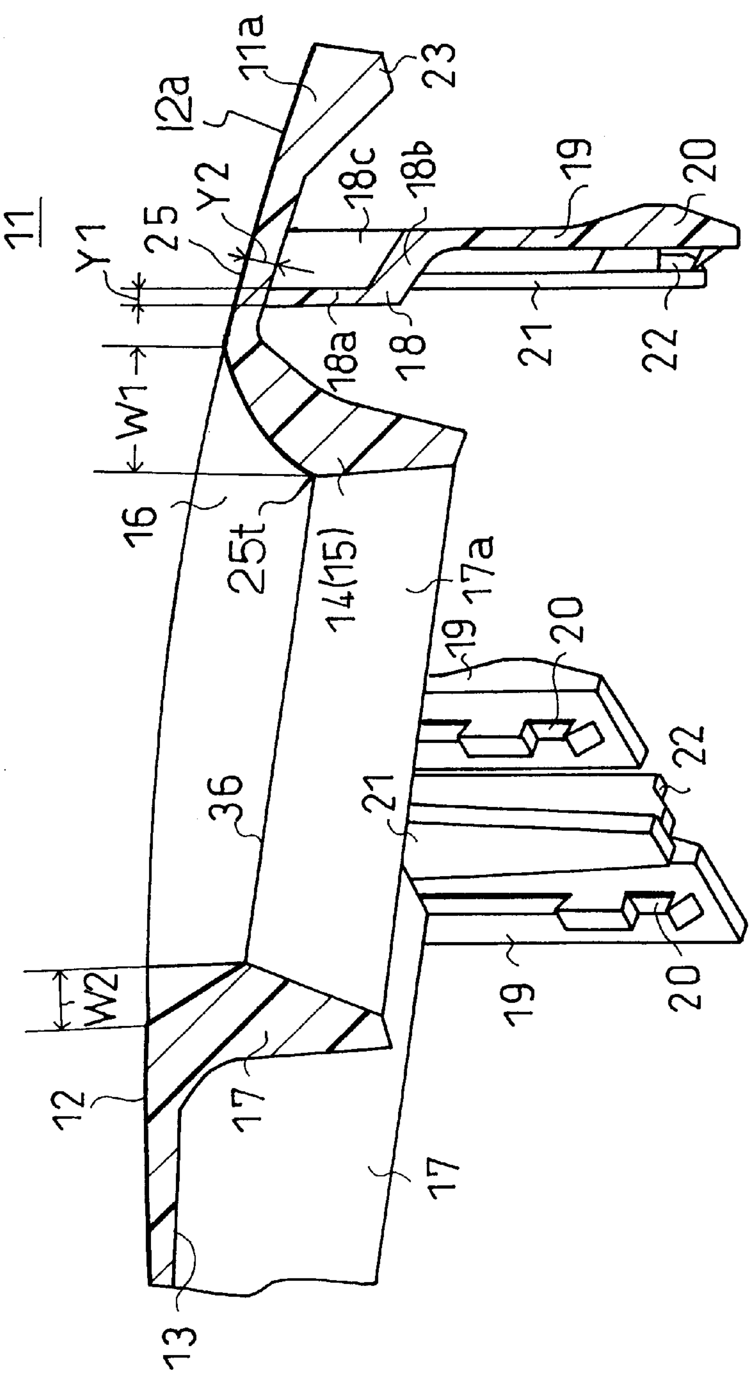
FIG. 2 is a partial cross-sectional view of the wheel cover shown in FIG. 1.

A wheel cover 11 is molded to have a disc-like form. The wheel cover 11 consists of an ABS resin main body 11*a* and a transfer layer 25 formed thereon. The main body 11*a* has a front surface 12 and a rear surface 13. The front surface 12 includes a relatively flat surface 12*a* and a number of decorative, sloping surfaces 16. The main body 11*a* has first communicating openings 14 and second communicating openings 15, which communicate the front surface 12 with the rear surface 13. The first and second openings 14 and 15 are arranged alternately in the circumferential direction as shown in FIG. 1. Each opening 14, 15 is surrounded by one of the sloped surfaces 16 of the front surface 12. Each sloped surface 16 is formed to trim the boundary between the opening 14, 15 and the front surface 12. As shown in FIG. 2, the sloped surfaces 16 of the wheel cover 11 have a radial width w1 on the outer side that is greater than the radial width w2 on the inner side of the wheel cover 11.

The first and second openings 14 and 15 each have a collar 17 protruding from the rear surface 13. Each collar 17 has an annular form conforming to the size of the corresponding opening 14, 15. Each collar 17 is tapered such that the size of the opening increases from the front surface 12 toward the rear surface 13. That is, an inner surface 17*a* of each collar 17 is inclined outward from the front surface 12 toward the rear surface 13. Each collar 17 is formed to have a wall thickness greater than that of the main body 11*a*.

Figure 3:
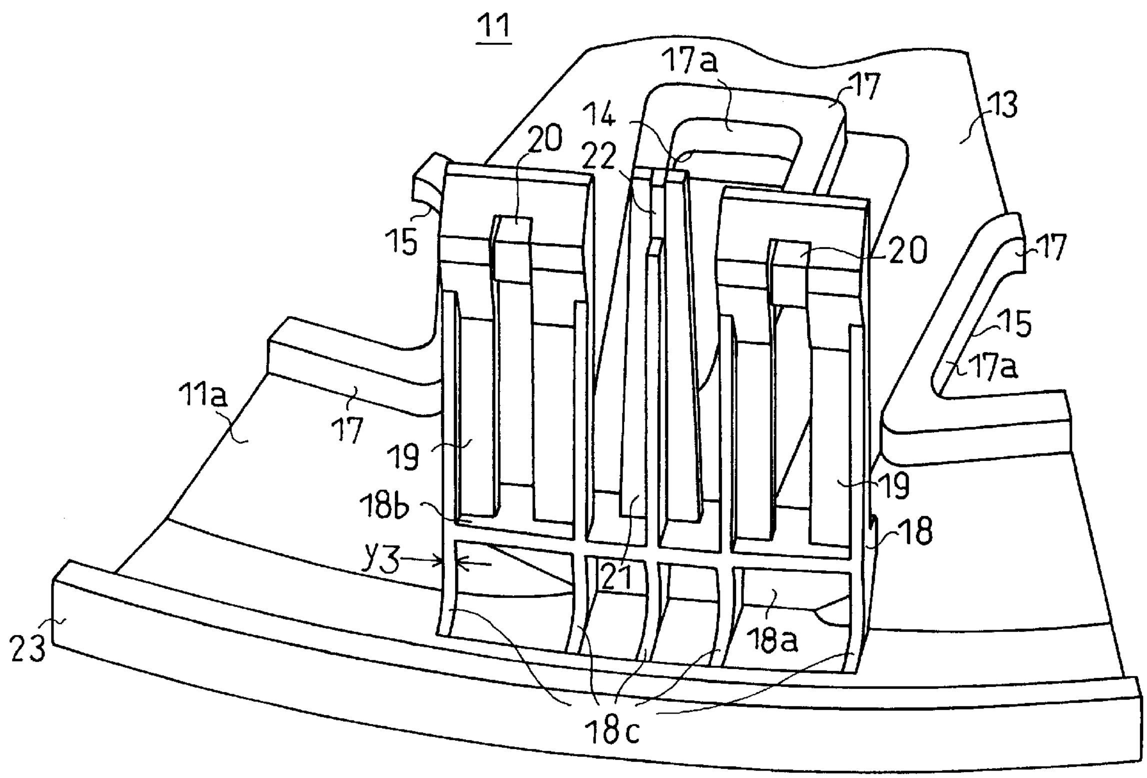
FIG. 3 is a partial perspective view of the wheel cover shown in FIG. 1.
Figure 4:
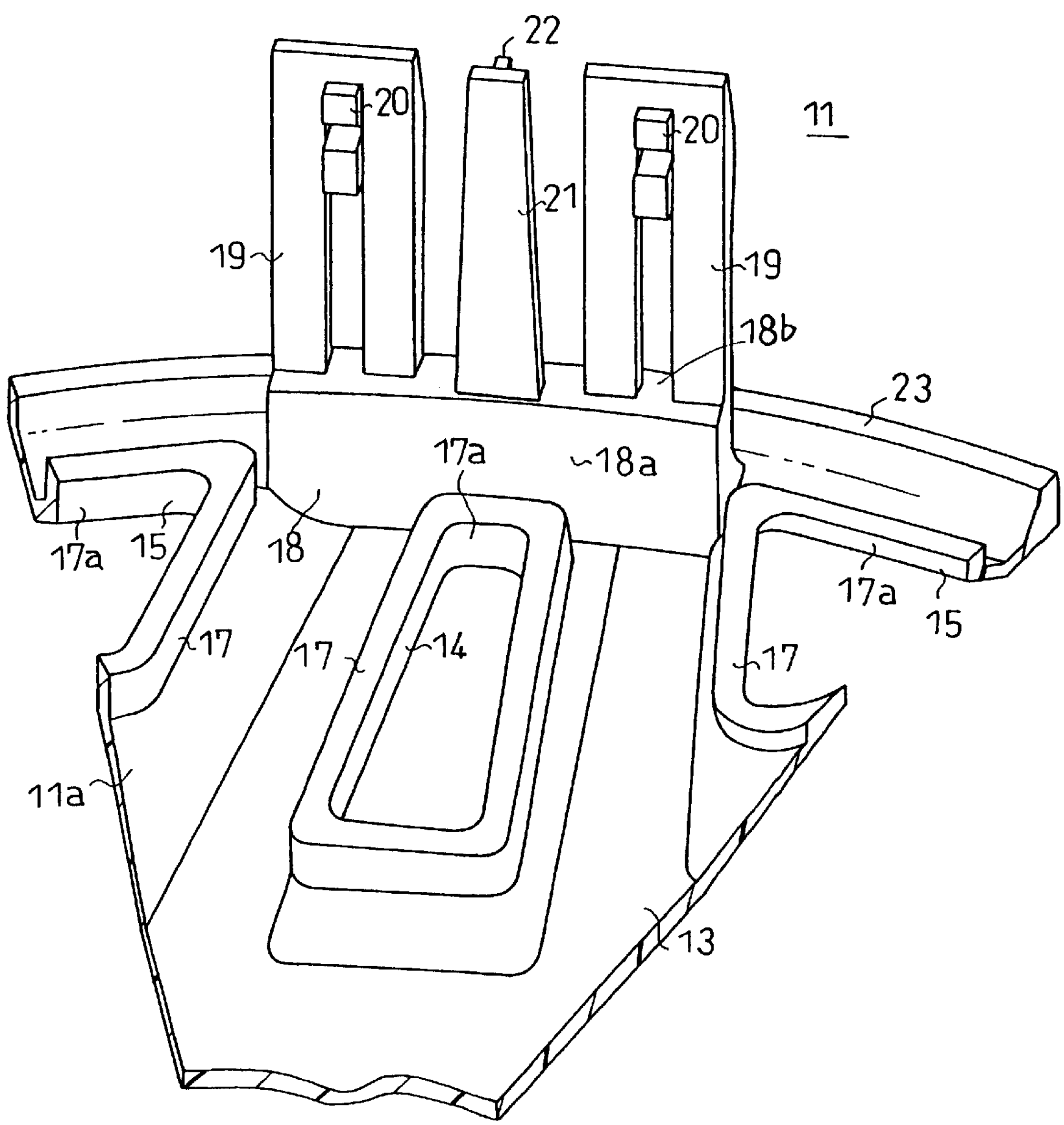
FIG. 4 is also a partial perspective view of the wheel cover shown in FIG. 1.

Holder bases 18 are formed on the rear surface 13 of the main body 11*a* at positions close to the periphery thereof. The holder bases 18 are aligned with the first openings 14, respectively, in the diametrical direction of the wheel cover 11. As shown in FIGS. 2 to 4, each holder base 18 has a base wall 18*a* formed on the rear surface 13 and an overhang 18*b* protruding radially outward from the base wall 18*a*. The overhang 18*b* is supported by ribs 18*c*.

The ratio of the thickness y1 of the base wall 18*a* to the thickness y2 of the portion of the main body 11*a* where the base wall 18*a* is formed is about 1/2.5. The thickness y3 of each rib 18*c* is about one half the thickness y1 of the base wall 18*a*.

A pair of first holders 19 are formed on the overhang 18*b*, and a first stopper 20 is formed at the end of each first holder 19. A second holder 21 is formed between the first holders 19. The second holder 21 has at its end a second stopper 22. A backup ring (not shown) is retained by the first and second stoppers 20 and 22. The wheel cover 11 has a flange 23 formed along its periphery.

Figure 5:
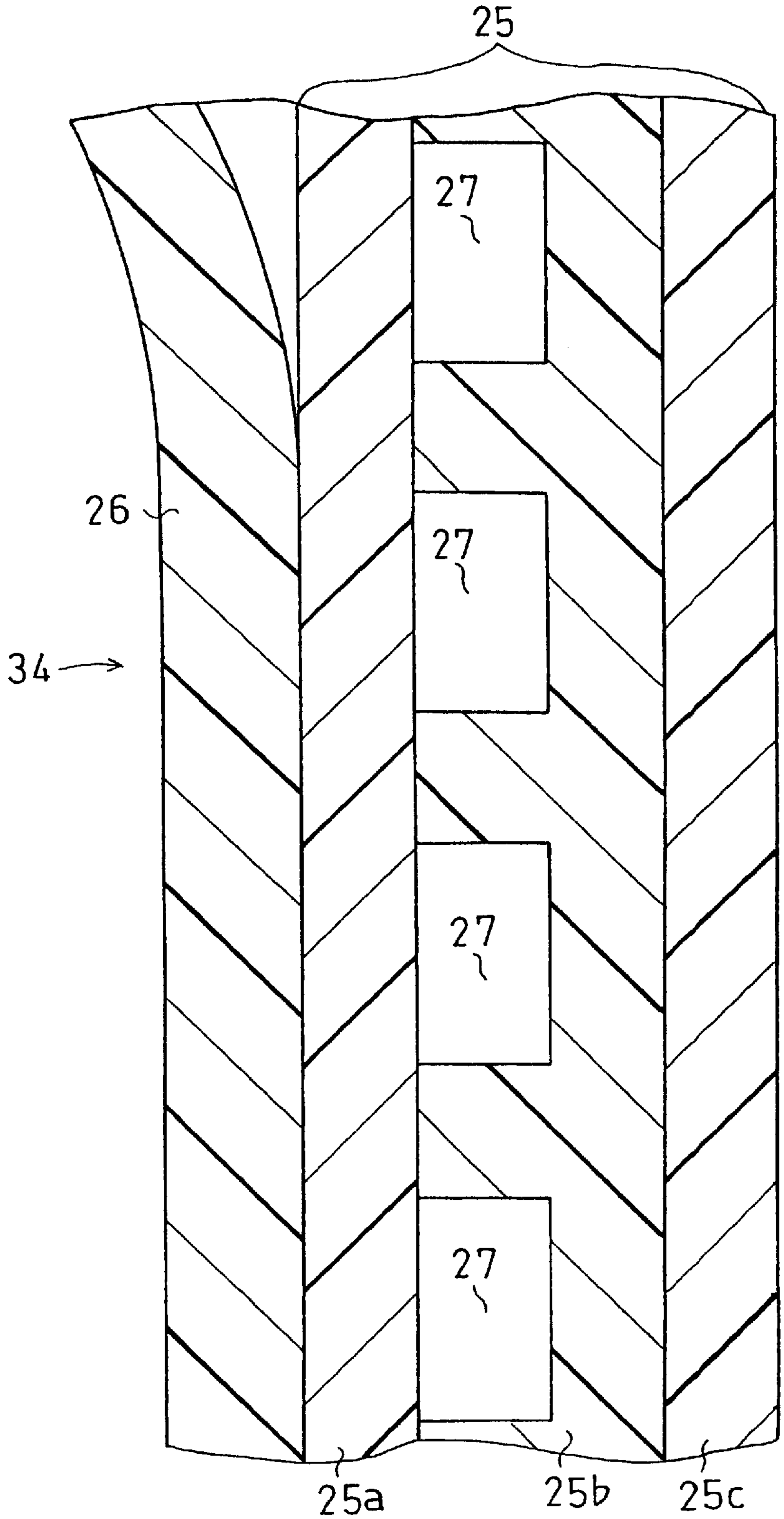
FIG. 5 is an enlarged cross-sectional view of the transfer layer of the wheel cover shown in FIG. 1.
Figure 6:
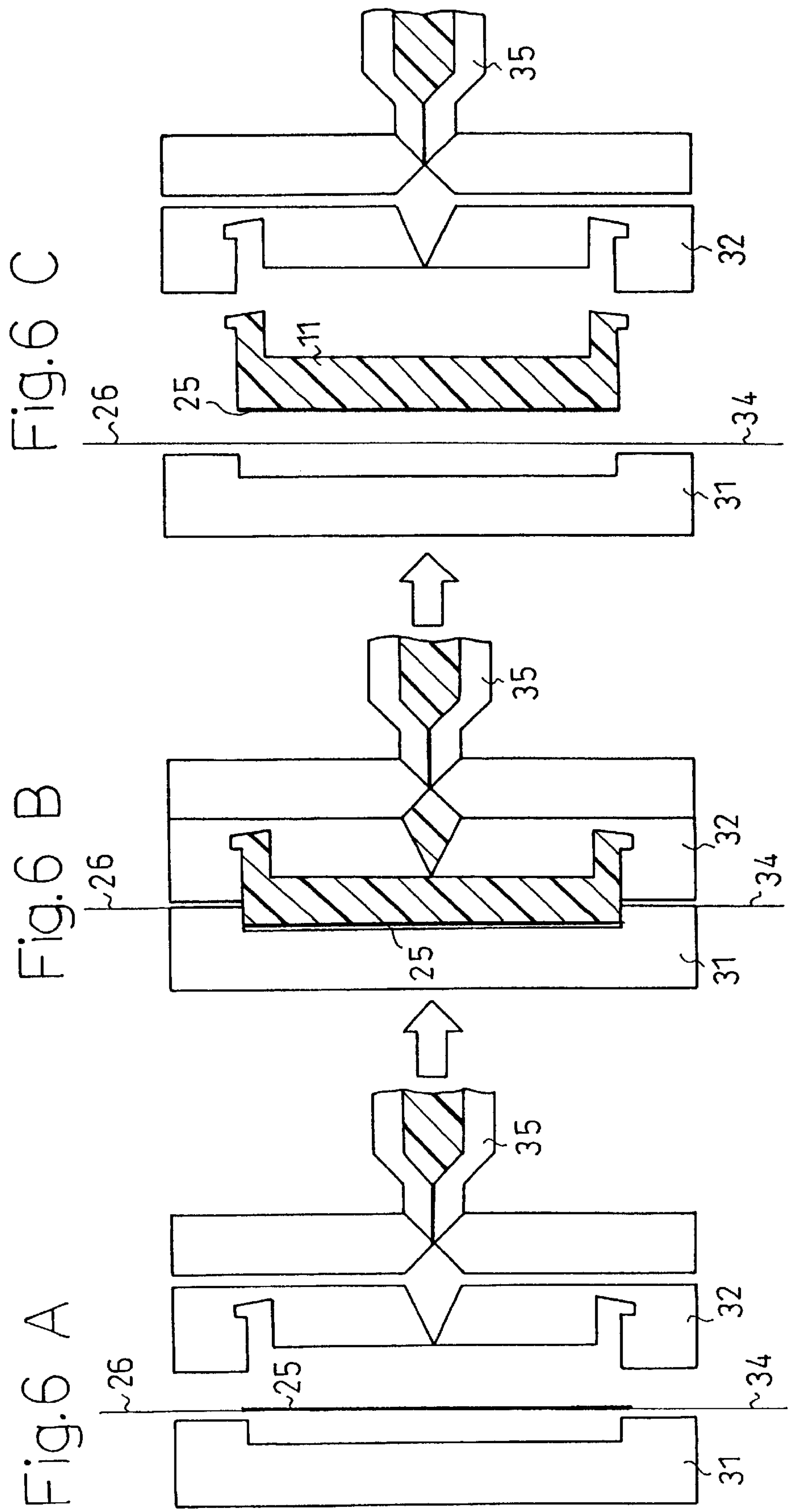
FIGS. 6A to 6C diagrammatically illustrate a process for producing the wheel cover shown in FIG. 1.

A transfer layer 25 is formed by means of in-mold transferring on the front surface 12 of the main body 11*a*. As shown in FIG. 5, the transfer layer 25 consists of a separating layer 25*a*, a colored layer 25*b* and an adhesion layer 25*c* formed in this order. The separating layer 25*a* is made of a resin material, which easily separates from a base film 26. The colored layer 25*b* has an aluminum vapor deposition face having a pattern 27 formed by silver vapor deposition. The adhesion layer 25*c* is fused onto the main body 11*a*. The transfer layer 25 is entirely coated with a transparent coating so as to improve weather resistance. The transfer layer 25 is formed on the front surface 12 of the main body 11*a* and on the sloped surfaces 16.

Next, the process for producing the wheel cover 11 will be described.

Figure 7:
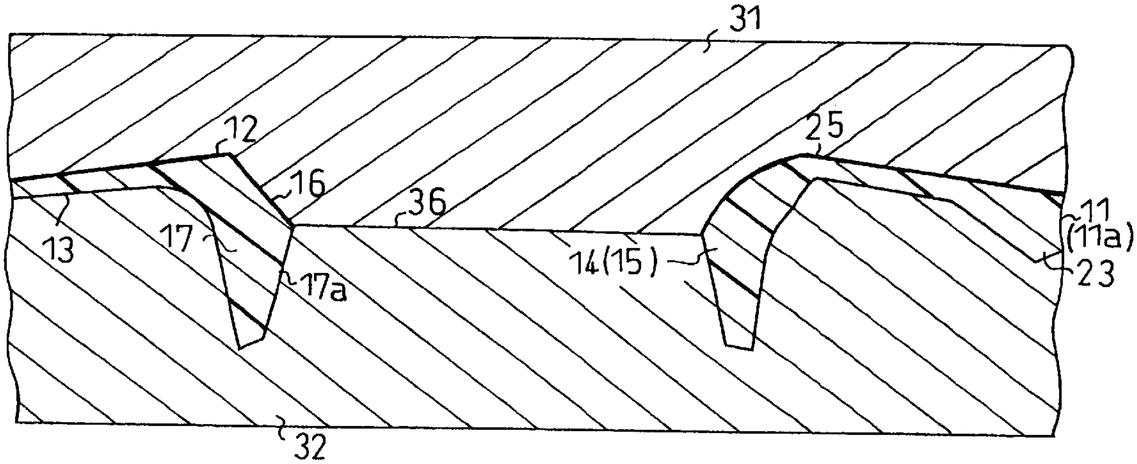
FIG. 7 is a diagrammatic view showing the state where a resin is injected into the dies to mold a wheel cover.

As shown in FIG. 6A, a transfer film 34 for in-mold transferring is placed between a first die 31 and a second die 32. The transfer film 34 consists of a base film 26 and a transfer layer 25. The transfer film 34 is placed such that the base film 26 is opposed to the first die 31 and that the transfer layer 25 is opposed to the second die 32. Subsequently, as shown in FIG. 6B, molten resin is injected from an injection molding machine 35 into the dies 31 and 32. The resin fills the dies 31 and 32 conforming to the configuration of the cavity and core and presses the transfer film 34. Thus, the transfer layer 25 is separated from the base film 26 and is transferred onto the resin. Since the sloped surfaces 16 are angled with respect to the relatively flat surface 12*a*, the steeper the angle is, the more extended the transfer layer 25 is on the sloped surfaces 16 under the pressing action of the resin. Thus, a terminal edge 25*t* of the transfer layer 25 is allowed to extend to a Parting line 36, where further extension of the layer 25 is stopped by the second die 32, as shown in FIG. 7.

Figure 8:
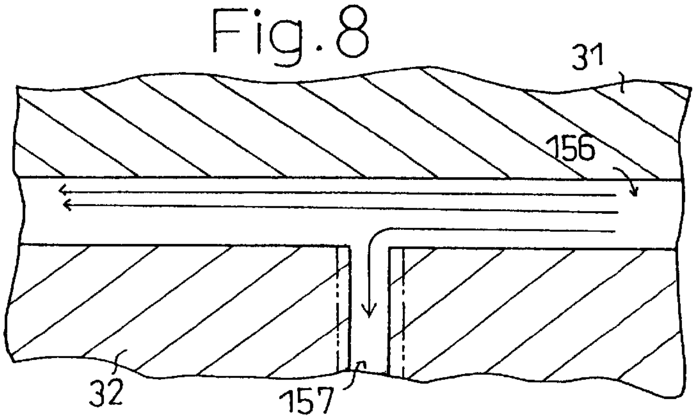
FIG. 8 is a diagrammatic view for illustrating flow of the resin.
Figure 9:
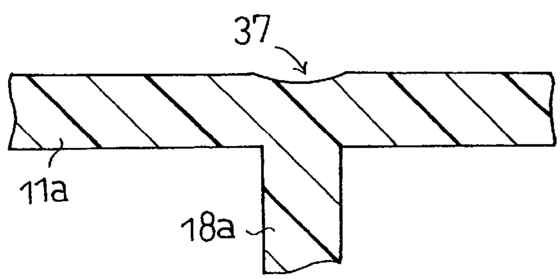
FIG. 9 is a partially enlarged cross-sectional view of a wheel cover having a shrinkage cavity.
Figure 10:
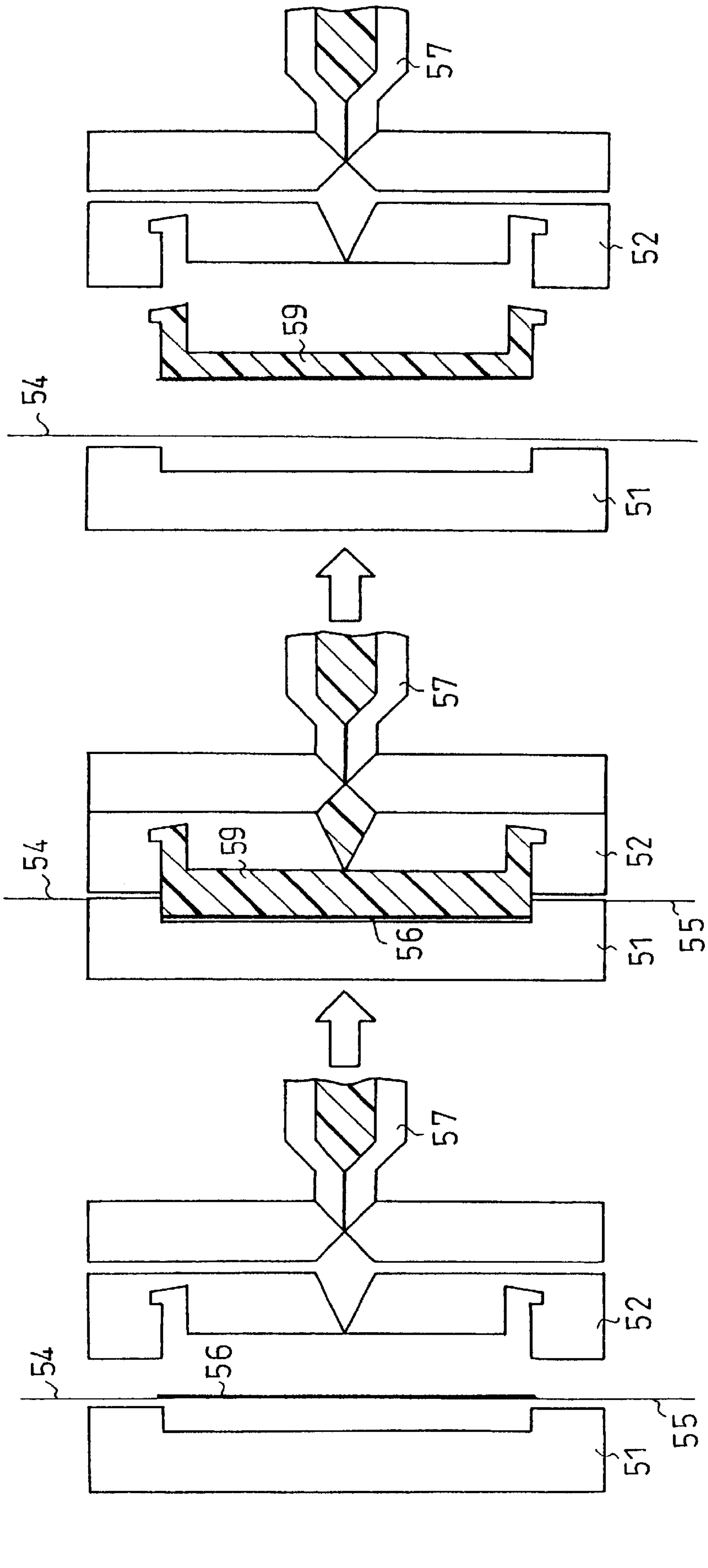
FIGS. 10A to 10C diagrammatically illustrate a process for producing a resin product according a prior art in-mold transfer method.
Figure 11:
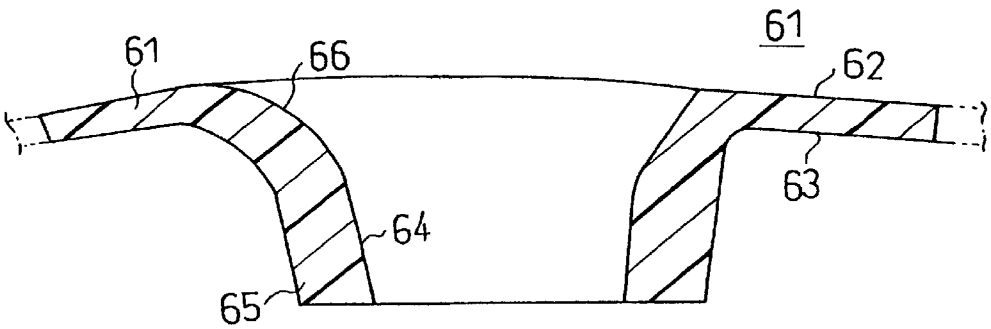
FIG. 11 is a partial cross-sectional view of a conventional wheel cover.
Figure 12:
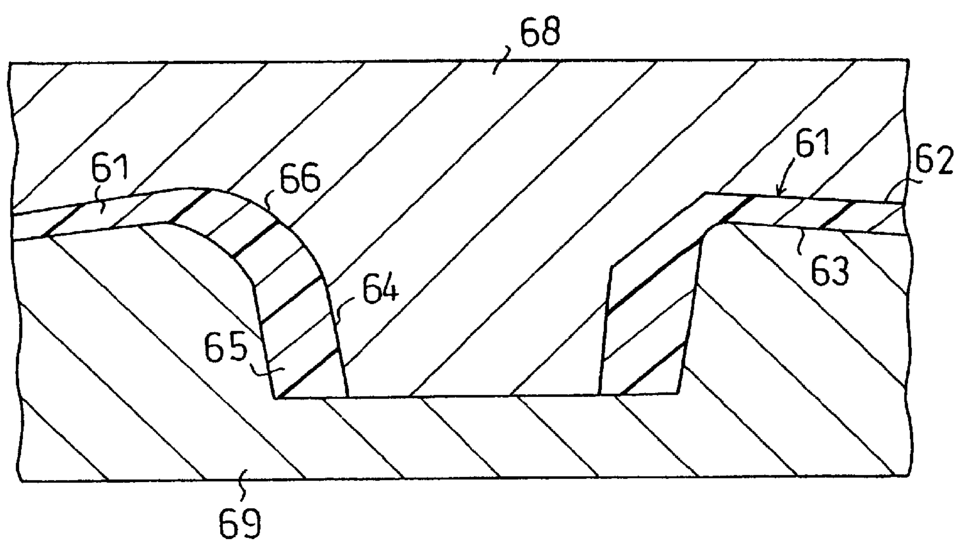
FIG. 12 is a partial diagrammatic cross-sectional view of a state where a resin is injected into the dies for producing the conventional wheel cover.
Figure 13:
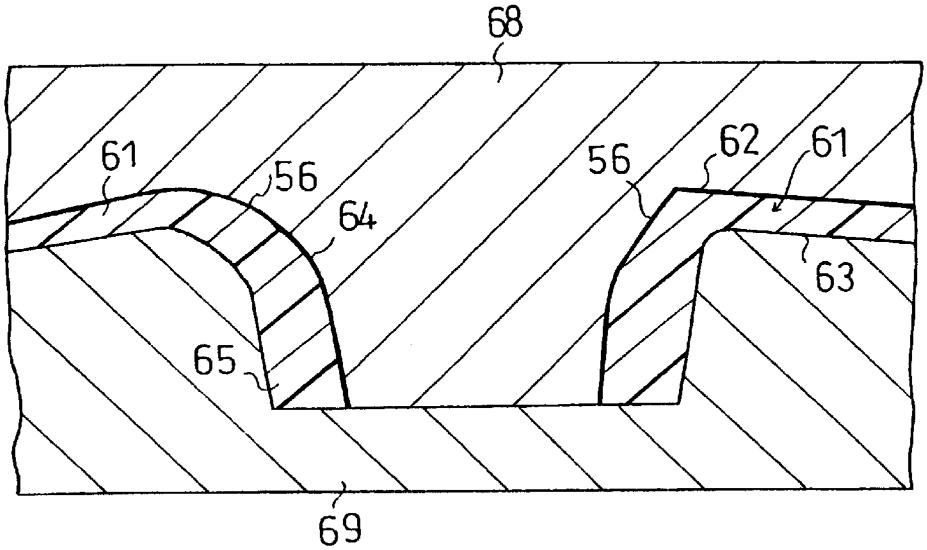
FIG. 13 is a partial diagrammatic cross-sectional view illustrating an in-mold transfer method with the dies of FIG. 12.
Figure 14:
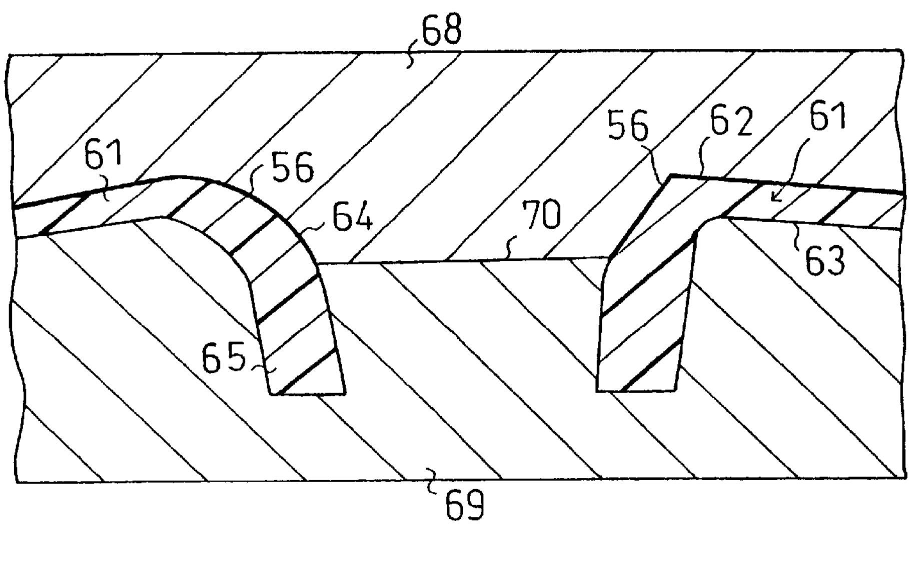
FIG. 14 is a partial diagrammatic cross-sectional view illustrating an in-mold transfer method with a variation of the dies of FIG. 12.

When the resin is being injected from the injection molding machine 35 into the dies 31 and 32, the resin flows into the cavity 156 of the dies 31 and 32 for forming the main body 11*a* and is partially diverted to channels 157 for forming the base walls 18*a*, as shown in FIG. 8. If the thickness of the base walls 18*a* were substantially the same as that of the main body 11*a*, as indicated by imaginary lines in FIG. 8, the resin flowing through the intersection of the cavity 156 and the channel 157 would be diverted mostly into the channel 157 for forming the base wall 18*a*. Consequently, the quantity of the resin would become insufficient at such intersections, and the resin would cure before the cavity 156 is filled with the resin. Thus, in such a case, shrinkage cavities 37 as shown in FIG. 9 would form on the front surface 12 of the main body 11*a*. However, the base walls 18*a* according to the preferred embodiment are designed to have a thickness y1, which is smaller than the thickness y2 of the portion of the main body 11*a* where the base walls 18*a* are formed. In other words, the resistance of the resin passing into channels 157 for forming the base walls 18*a* is relatively high, so a large quantity of resin does not flow into the channels 157 at the intersection points where the channels 157 diverge from the cavity 156. Thus, an adequate amount of resin is supplied to the intersection points, and no shrinkage cavity 37 forms on the front surface 12 of the main body 11*a*.

After the resin is cured, the first die 31 and the second die 32 are separated from each other as shown in FIG. 6C. When the dies 31 and 32 are separated, the Parting line 36 is located at the boundary between the decorative surface 16 and the inner wall surface 17*a* of the collar 17, as shown in FIG. 7. Since the inner wall surface 17*a* is inclined outward from the front surface 12 toward the rear surface 13, the second die 32 can be separated smoothly without being hindered by the inner circumferential wall surface 17*a*.

The illustrated embodiment has the following effects.

While a transfer layer 25 is transferred onto the front surface 12 of the main body 11*a* by means of in-mold transferring, the portion of the transfer layer 25 to be formed on each sloped surface 16 is extended under the pressing action of the resin, since the sloped surface 16 is inclined. However, the transfer layer 25 cannot be extended beyond the parting line 36, the boundary between the sloped surface and the opening 14, 15, so that the transfer layer 25 is prevented from being extended beyond the critical point of extension, resulting in breakage or wrinkling. Further, since the transfer layer 25 is not overly extended, the transfer layer 25 does not lose its luster.

Since the collars 17, which are thicker than the main body 11*a*, are formed, the first and second openings 14 and do not reduce the rigidity of the body 11*a*. Further, the collars 17 give the impression that the wheel cover 11 is thick, or it appears to be thicker than it actually is, like the prior art wheel covers.

The inside dimension of each collar 17 increases from the front surface 12 toward the rear surface 13. Accordingly, the second die 32 can be separated smoothly without being hindered by the inner circumferential wall surface 17*a*. Thus, even if the parting line 36 is shifted toward the front surface 12 to eliminate the problems associated with the transfer layer 25, the second die 32 can be separated from the first die 31.

Since the base wall 18*a* is thinner than the main body 11*a* around it, no shrinkage cavity is formed on the front surface 12 of the main body 11*a* of the molded product. However, if the base wall 18*a* is thin, the base wall 18*a* itself lacks sufficient rigidity for supporting the first holders 19 and the second holder 21. However, in the preferred embodiment, the overhang 18*b* together with the ribs 18*c* supporting the overhang 18*b* constitute the holder base 18, so that sufficient strength and rigidity for supporting the first holders 19 and the second holder 21 is achieved. Further, since the ribs 18*c* are still thinner than the base wall 18*a*, no shrinkage cavities are formed on the front surface 12 of the main body 11*a* of the molded product.

Each sloped surface 16 is designed to have a radial width w1 on the outer side that is greater than a radial width w2 on the inner side of the wheel cover 11. Accordingly, the extension per unit area of the transfer layer 25 is smaller on the wider outer side portion. Consequently, problems such as cracking rarely occur on the outer side compared with the inner side. Since a silver layer is formed particularly on the wider outer portion of each sloped surface 16, according to the preferred embodiment, the silver layer can be formed neatly and without defects. The wider, outer side portions, where the silver layer is formed, attracts more attention from viewers.

It should be apparent to those skilled in the art that the present invention may be embodied in many other specific forms without departing from the spirit or scope of the invention. For example, the following variations are possible:

While the main body 11*a* is made of an ABS resin in the foregoing embodiment, it may be replaced with other resins such as polypropylenes, polycarbonates, modified polyphenyleneoxides and polyamides.

The collars 17 formed in the illustrated embodiment are not essential. For example, the collar 17 can be omitted if the thickness of the main body 11*a* is increased. In this case, the wall surface corresponding to the inner wall surface 17*a* is designed to be inclined outward from the front surface 12 toward the rear surface 13.

Therefore, the present examples and embodiments are to be considered as illustrative and not restrictive, and the invention is not to be limited to the details given herein, but may be modified within the scope of the appended claims.

We claim:

1. A molded resin wheel cover comprising:

a main body, the main body including a front surface and a rear surface, the front surface including a relatively flat surface and a sloped surface;

a transfer layer, which is transferred onto the front surface when the wheel cover is molded;

a collar extending rearward from the rear surface, wherein the collar has an inner surface defining an opening that extends through the main body, the size of the opening being at least the same at the rearmost extremity of the inner surface of the collar as it is at the frontmost extremity of the inner surface of the collar, wherein the frontmost extremity of the opening borders the sloped surface such that the sloped surface is inclined inwardly toward the opening, and the frontmost extremity of the opening is located rearward of the sloped surface; and a parting line defined by a meeting of mold parts in the molding process, the parting line being forwardly spaced apart from the rearmost extremity of the collar and defining a boundary between the sloped surface and the inner surface of the collar, wherein the transfer layer has a terminal edge located frontward of the inner surface of the collar.

2. The wheel cover according to claim 1, wherein the sloped surface surrounds the opening.

3. The wheel cover according to claim 2, wherein the radial dimension of the sloped surface is greater on the radially outward side of the opening than on the radially inward side of the opening.

4. The wheel cover according to claim 1, wherein the opening is tapered from the parting line to the rearmost extremity of the inner surface of the collar such that the size of the opening increases in the rearward direction.

5. The wheel cover according to claim 1, wherein the wall thickness of the collar is generally greater than the wall thickness of the main body, the wall thickness of the main body being measured from the front surface to the rear surface.

6. The wheel cover according to claim 1, including a holder structure protruding from the rear surface of the main body for mounting the wheel cover to a wheel, wherein at least one dimension of the holder structure is smaller than the wall thickness of the main body where the holder structure meets the main body to create resistance to the flow of molten resin into the holder structure from the main body during molding, the wall thickness of the main body being measured from the front surface to the rear surface.

7. The wheel cover according to claim 6, wherein the holder structure includes a base, which joins with the rear surface of the main body, the base including a base wall extending from the rear surface of the main body, the base wall having a wall thickness that is less than the wall thickness of the main body, and wherein at least one wall-like rib is formed perpendicularly to the base wall, wherein the rib makes the base more rigid.

8. A wheel cover formed by injecting a molten resin into a closed mold, the wheel cover comprising:

a main body having a front surface and a rear surface, wherein the front surface includes a relatively flat surface and a sloped surface;

a transfer layer, which is transferred onto the front surface when the wheel cover is molded; and a tapered opening formed in the main body, wherein the size of the opening is greater at its rearmost extremity than at its frontmost extremity, and wherein the sloped surface is formed on the front surface between the opening and the relatively flat surface such that the sloped face is sloped with respect to the relatively flat surface toward the opening, wherein a boundary line between the sloped surface and the frontmost extremity of the opening is a parting line where dies are separated from each other during molding.

9. A method of molding a resin wheel cover comprising:

injecting molten resin into a closed mold, the mold having a front die and a rear die;

forming a front surface with the front die and a rear surface with the rear die;

forming a sloping surface on the front surface with the front die;

forming an opening with the rear die, wherein a parting line between the front die and the rear die is formed at a boundary between the opening and the sloping surface;

forming a collar that extends from the rear surface of the main body with the rear die, wherein the inner surface of the collar defines the opening, the size of the opening being at least the same at the rearmost extremity of the inner surface as it is at the frontmost extremity of the inner surface, the parting line being spaced frontward of the rearmost extremity of the inner surface of the collar; and transferring a transfer layer to the front surface during molding, wherein the transfer layer is not permitted to extend rearwardly beyond the parting line.

10. The method according to claim 9, including forming the sloped surface to surround the opening.

11. The method according to claim 10, including forming the sloped surface to have a larger radial dimension on the radially outer side of the opening than on the radially inner side of the opening.

12. The method according to claim 9, including tapering the inner surface of the collar such that the size of the opening is greater at its rearmost extremity than at its frontmost extremity.

* * * * *